United States Patent
Chen et al.

(10) Patent No.: US 8,059,657 B2
(45) Date of Patent: Nov. 15, 2011

(54) SYSTEM FOR QOS AWARE REVERSE LINK ADMISSION CONTROL IN WIRELESS COMMUNICATION SYSTEMS

(75) Inventors: Yong Chen, Plano, TX (US); Mazin Al-Shalash, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 975 days.

(21) Appl. No.: 11/841,169

(22) Filed: Aug. 20, 2007

(65) Prior Publication Data

US 2009/0054072 A1 Feb. 26, 2009

(51) Int. Cl.
*H04L 12/28* (2006.01)
(52) U.S. Cl. ............... 370/395.2; 455/452.2; 455/452.1; 455/451
(58) Field of Classification Search .................. 455/450, 455/451, 452.1, 452.2, 453, 455; 370/395.2
See application file for complete search history.

(56) References Cited

U.S. PATENT DOCUMENTS

| | | | | |
|---|---|---|---|---|
| 5,838,671 A * | 11/1998 | Ishikawa et al. | ............. | 370/335 |
| 6,611,506 B1 * | 8/2003 | Huang et al. | ................. | 370/329 |
| 6,958,986 B2 * | 10/2005 | Cain | ............................. | 370/337 |
| 7,382,758 B2 * | 6/2008 | Silverman et al. | ............ | 370/338 |
| 7,634,278 B2 * | 12/2009 | Takayanagi et al. | ........ | 455/452.2 |
| 2003/0060209 A1 | 3/2003 | Bruin et al. | | |
| 2005/0052996 A1 | 3/2005 | Houck et al. | | |
| 2006/0067298 A1 | 3/2006 | Houck et al. | | |
| 2006/0120321 A1 * | 6/2006 | Gerkis et al. | .................. | 370/329 |
| 2006/0291383 A1 * | 12/2006 | Bi et al. | ........................ | 370/229 |
| 2007/0105575 A1 * | 5/2007 | Sampath et al. | ............. | 455/509 |
| 2009/0054072 A1 * | 2/2009 | Chen et al. | .................... | 455/450 |

FOREIGN PATENT DOCUMENTS

CN 1889379 A 1/2007

* cited by examiner

*Primary Examiner* — Kent Chang
*Assistant Examiner* — Ronald Eisner
(74) *Attorney, Agent, or Firm* — Slater & Matsil, L.L.P.

(57) ABSTRACT

A system, comprising various methods and apparatus, for Reverse Link Admission Control (RLAC) with QoS differentiation in wireless communication systems is disclosed. With the present invention, wireless systems may admit new calls or transmission flows based upon sector loading conditions QoS requirements or characteristics of an incoming transmission—providing optimal system performance and stability while addressing QoS needs.

14 Claims, 3 Drawing Sheets

SYSTEM FOR QOS AWARE REVERSE LINK ADMISSION CONTROL IN WIRELESS COMMUNICATION SYSTEMS

TECHNICAL FIELD OF THE INVENTION

The present invention relates generally to wireless communication systems and, more particularly, to a system for Reverse Link admission control, with quality of service (QoS) differentiation in wireless communication systems.

BACKGROUND OF THE INVENTION

In general, performance and capacity of wireless mobile communication systems are limited by air-interface propagation-channel characteristics; such as co-channel interference, path loss, multipath fading, etc. In a cellular wireless mobile communication system, a plurality of mobile stations (MSs) located in one cell perform wireless communication with a base station (BS) that manages that cell. The BS receives uplink signals from each MS.

A signal transmitted by a first MS may act as an interference component in relation to a signal transmitted by a second MS. When there are many MSs, or some MSs transmitting at high power, in a given area (i.e., sector) of a cell, the sector is considered as having high load; and the reverse link interference for that sector is generally high. As such—in a wireless mobile communication system—reverse link admission or load control should be performed in order for a BS to receive signals from MSs in a stable manner.

In a Code Division Multiple Access (CDMA)-based cellular wireless mobile communication system, reverse link interference is measured using a Rise-Over-Thermal (ROT) index. The term "ROT" as used herein refers to a ratio of a sum of total received power to thermal noise; or a difference of the sum of total received power (RSSI), in dBm, and thermal noise, also in dBm. ROT can be represented by Equation (1):

$$ROT(dB) = RSSI(dBm) - Thermal\_Noise\_Floor(dBm) \quad (1).$$

Load (L) is another measure for Reverse Link loading level. In principle, ROT and L should be related to each other—that relationship being expressed as:

$$ROT = \frac{1}{(1-L)}. \quad (2)$$

If Y is defined as intra-cell computed load, then the actual sector load is (1+f)(Y); where f is an inter-cell interference factor. Correspondingly, ROT can be obtained from Y:

$$ROT = \frac{1}{1-(1+f)(Y)}. \quad (3)$$

There are conventional methods to control admission by setting a fixed threshold of ROT or Load [1]. This may not apply, or may not utilize the full capacity of a deployed wireless network with multimedia services because the ROT and Load are fluctuating over a large range.

Conventional methods of Reverse Link Admission Control generally control ROT or Load level in one dimension, or as a total value—without considering that different loads can not or do not account for quality of service (QoS) metrics for new or already-initiated transmissions (i.e., calls). As wireless networks and communications system evolve to become more QoS-aware, it becomes critical that Reverse Link Admission Control differentiates new or already-initiated transmissions according to their corresponding QoS levels.

Differentiation by QoS facilitates transmissions of different types of multimedia services. Most such services can be categorized into a number of types, according to delay constraints and bandwidth requirements. As a convention in 1xEV-DO system, for example, service flows are categorized as: Expedited Forwarding (EF); Assured Forwarding (AF); and Best Effort (BE). The EF flow is delay sensitive and characterized by a low data rate; the AF flow is delay sensitive and elastic; and the BE flow is delay tolerant and elastic.

As an example, IS-856 (1xEV-DO) systems have a mechanism to control reverse link load—called Closed-loop Load Control, via direct ROT measurement. With this mechanism, ROT is measured at a sector and compared with a set ROT Threshold. If the measured value is higher than the threshold, the value of a Reverse Activity Bit (RAB) is set to 1. If the measured value is lower than the threshold, the RAB value is set to 0 or −1. The RAB value is broadcast to terminals within the sector, so as to increase or decrease data rate of each terminal. A filtered RAB (FRAB) value—measured or estimated over a period of time—indicates long-term sector loading. At a BS, a ratio of time when RAB is set to 1 may be determined—which is called BusyTimeRatio and is denoted by b.

In 1xEV-DO RevA (DOrA) system that supports QoS and multi-flow packet applications, Reverse Link Load Control is further enhanced by a TrafficToPilot (T2P) allocation mechanism—where T2P is a ratio of Traffic Channel power to Pilot Channel power. T2P allocation is sector loading dependent, and is determined by flow QoS and packet transmission rate of a mobile user. Conversely, load is function of T2P values of each terminal within a sector.

Channels in DOrA system reverse link comprise: a Pilot channel; a Data Rate Control (DRC) channel; a Data Source Control (DSC) channel; an ACK channel; a Reverse Rate Indicator (RRI) channel; and a Traffic channel. The DRC, DSC, ACK and RRI are overhead channels and always on, as long as a DO connection is established between an MS and a BS.

As a result, there is a need for an admission control system that differentiates QoS requirements and, to the greatest extent possible, utilizes and cooperates with already-existing system metrics and mechanisms—such as ROT and the load estimated via T2P and b.

SUMMARY OF THE INVENTION

The present invention provides a system, comprising various methods and apparatus, for Reverse Link Admission Control (RLAC) with QoS differentiation in wireless communication systems. According to the present invention, wireless systems may admit new calls or transmission flows based on system load and QoS of an incoming transmission—providing optimal system performance and stability while addressing QoS needs. The system of the present invention may determine admission based not only on ROT level, but also the load condition estimated via T2P and b.

According to the present invention, the relationship between ROT and Load is exploited. ROT range is divided into three regions—low-ROT, mid-ROT and high-ROT. Within a Low-ROT region, all calls or flows are admitted; in a High-ROT region, no calls or transmission flows are admitted. In a Mid-ROT region, load condition which depends on the current load, the new load addition and the elastic flow load reduction must be satisfied in order for the new call or flow to be admitted. The QoS differentiation is achieved in the load estimation via the T2P and b.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

The present invention provides a system, comprising various methods and apparatus, for Reverse Link Admission Control (RLAC) with QoS differentiation in wireless communication systems. According to the present invention, wireless systems may admit new calls or transmission flows based on sector loading conditions and QoS of an incoming transmission—providing optimal system performance and stability while addressing QoS needs. The system of the present invention may determine admission based on ROT level and b.

Figure 1:
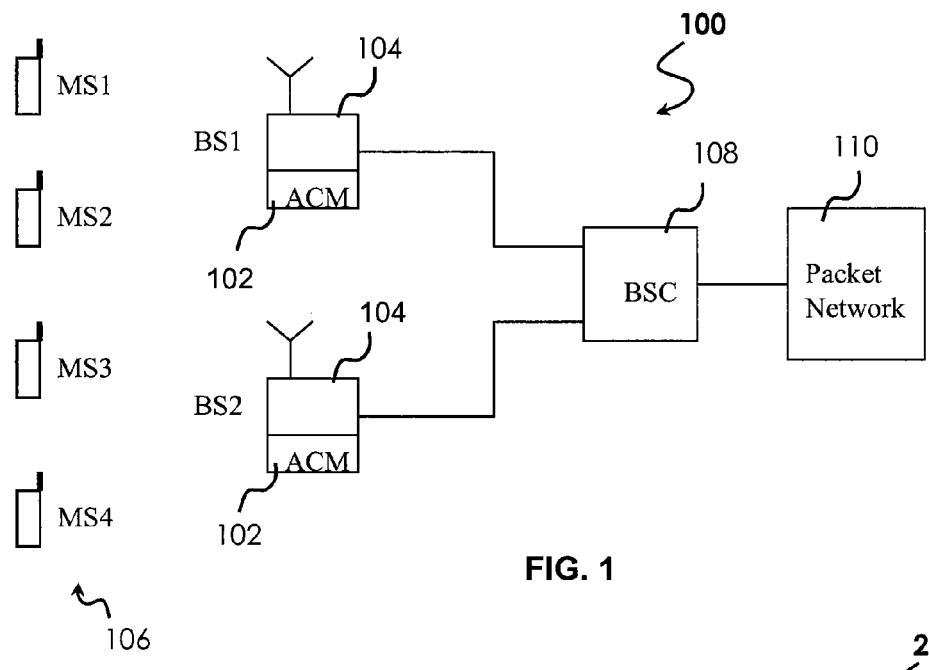
FIG. 1 is a diagram depicting an illustrative embodiment of a wireless system with an admission control module according to certain embodiments of the present invention.

Referring now to FIG. 1, selected portions of a wireless communication system 100 are depicted, with an Admission Control Module (ACM) 102 located in each base station (BS) 104. A plurality of mobile stations (MSs) 106 operate in communication with the BSs 104. The network 100 comprises a base station controller (BSC) 108, which may communicate with the BSs 104, and operates to facilitate communications between the MSs 106 and some suitable access or transmission network 110 (e.g., packet network).

The communications network 100 comprises an ACM 102 associated with each base station 104. In some alternative embodiments, an ACM 102 may be associated with BSC 108—obviating the need for a separate or dedicated module for each base station. Having an ACM associated with each base station does not, however, require any additional communications along the backhaul between BSs and BSC—for purposes of making new call admission determinations.

As used hereinafter, the term "new call" includes a new call from an MS requesting new service within a sector, as well as a transmission flow requested by an MS currently served within a sector that was using at least one different flow. Thus, a "new call" may comprise a request from a new caller, or a new service request from a caller already being served in a sector. In addition, the term "new call" comprises instances in which a new sector is added to an active set in a soft handoff.

In system 100, ACM 102 determines whether to admit a new call to at least one sector served by its respective BS, based upon current sector loading conditions and a required QoS of the new call. ACM 102 determines current loading of each sector served by its corresponding BS. ACM 102 also obtains radio resource parameters from BSC 108.

Figure 2:
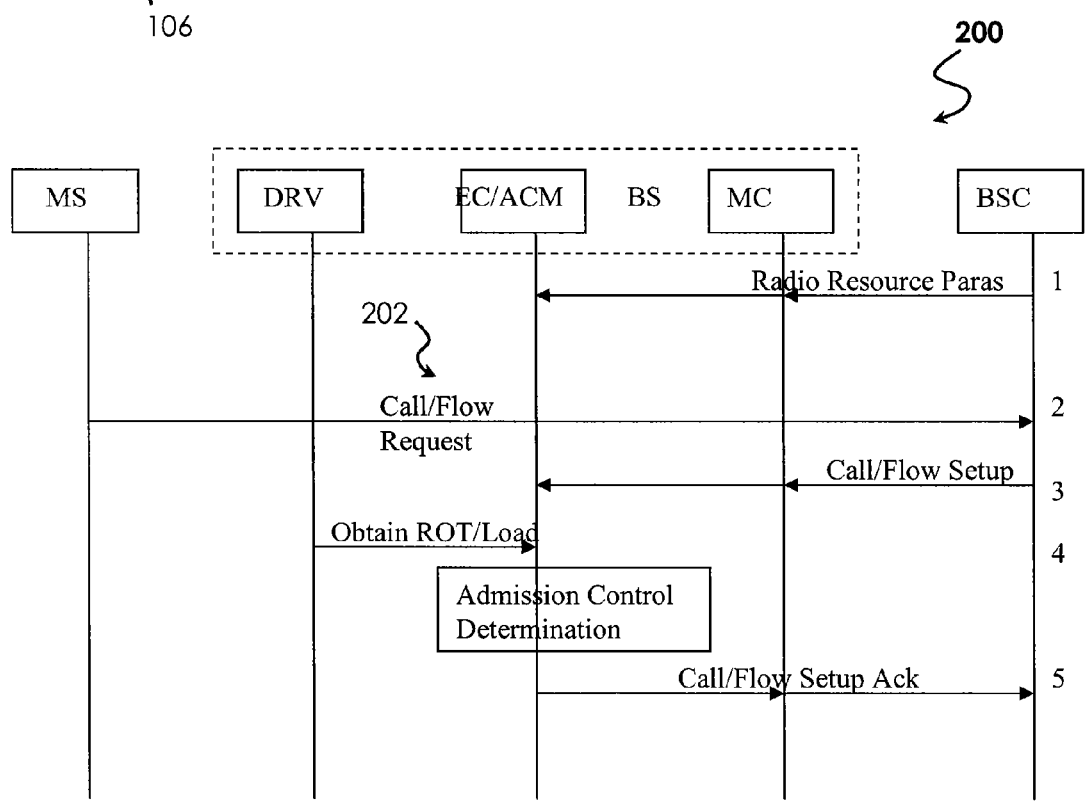
FIG. 2 is a diagram depicting an illustrative flow for origination of a new call according to certain embodiments of the present invention.

Referring now to FIG. 2, a diagram depicts an illustrative call flow 200 for origination of a new call. In 1xEV-DO RevA, a "Call/Flow Request" 202 may be a ConnectionRequest (CR) message sent by a new user, or a ReservationOnRequest (ROR) message, sent by an existing user in order to initiate a new flow, or both messages at the same time.

Certain metrics or values may be utilized by an ACM, to estimate loading or load distribution, for its admission control determination. The ROT of a sector must be measured by a BS receiver, and be available to the ACM. Computed Load may be available to the ACM, from the base station receiver. BusyTimeRatio b must also be available to the ACM.

Figure 3:
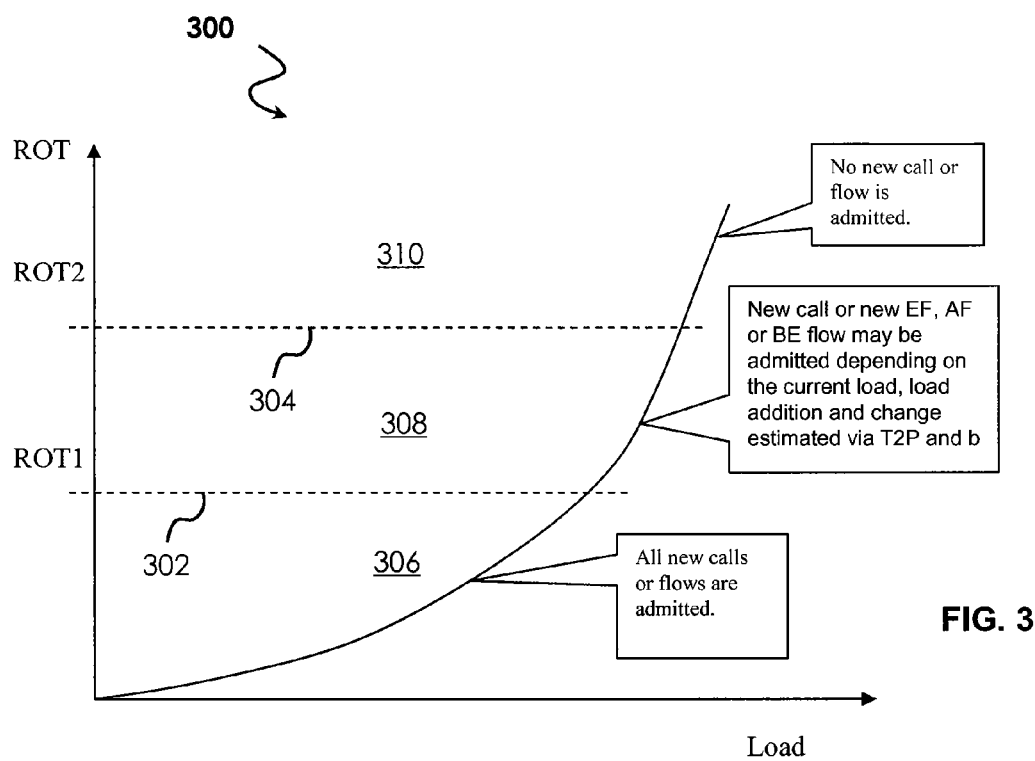
FIG. 3 is a diagram depicting QoS Aware RLAC, in ROT-Load domain, according to certain embodiments of the present invention.

The ROT range is divided into three regions: a Low-ROT region; a Mid-ROT region and a High-ROT region. FIG. 3 provides an illustrative depiction of a plot 300 of measured ROT in relation to ComputedLoad. Two ROT thresholds (ROT1) 302 and (ROT2) 304 separate Low-ROT region 306, Mid-ROT region 308 and High-ROT region 310. The ROT thresholds may be selected or set to appropriate values that yield desired performance characteristics. For example, ROT1 302 may be set to be the same as the ROT threshold for RAB; defined as the value above which RAB is set to 1. ROT2 304 may be set at a maximum ROT value allowed for the given sector.

When an Admission Control procedure is triggered (i.e., a new call is initiated), an ACM checks certain preconditions before looking into the load condition to determine whether or not sufficient resources are available for a new call to be admitted. The ACM checks that the of MAC channels does not exceed a maximum value allowed. The ACM checks that the number of remaining channel elements is equal to or greater than a minimum allowed number. The ACM also checks that the number of (specific application) users does not exceed a preset maximum number allowed. If any of these preconditions are not satisfied, the new call is rejected and processing stops.

If, however, the preconditions are satisfied, then the ACM starts the following procedure: in Low-ROT region 306, where ROT<ROT1, all "new calls" are admitted; in High-ROT region 310, where ROT>ROT2, no "new call" is admitted; and in Mid-ROT region 308, where ROT1<ROT<ROT2, a "new call" from Soft Handoff (SHO) is admitted. For a non-SHO "new call", the "new call" (or new EF, AF or BE flow) may be admitted only when the following condition is satisfied, which depends on the current load, the load addition and the current value of b; otherwise, this "new call" is rejected:

$$Y_{max} - \sum_{i \in BEUser} \Delta Y_i > Y_j + Y_{current} \quad (4)$$

where Ymax is the load threshold derived from the $ROT_{max}$ threshold which should not be exceeded from Equation (2), and $$\sum_{i \in BEUser} \Delta Y_i = \sum_{i=1}^{N} \int_{b\_cur}^{b\_max} \frac{\partial Y_i}{\partial T2P_{i,BE}} \frac{\partial T2P_{i,BE}}{\partial b} db. \quad (5)$$

Yj is the load contributed by the "new call":

$$Y_j \approx \frac{\left(\overline{\frac{E_{c,p}}{Nt}}\right)_j (1 + H_j + T2P_j)}{1 + \left(\frac{E_{c,p}}{N_t}\right)(1 + H_j + T2P_j)} \quad (6)$$

for a new call, or $$Y_{j,newflow} \approx Y_j(T2P_{j,new}) - Y_{j,current} \quad (7)$$

for a new flow from an existing user.

In Equation (5), b_max is a constant, which can be determined based on the curve of T2P vs. b for the BE flow. The value from Equation (5) provides maximum load reduction possible for existing BE flows in the sector. Then condition (4) gives provides a most upper limit for the "new call" admission condition.

Figure 6:
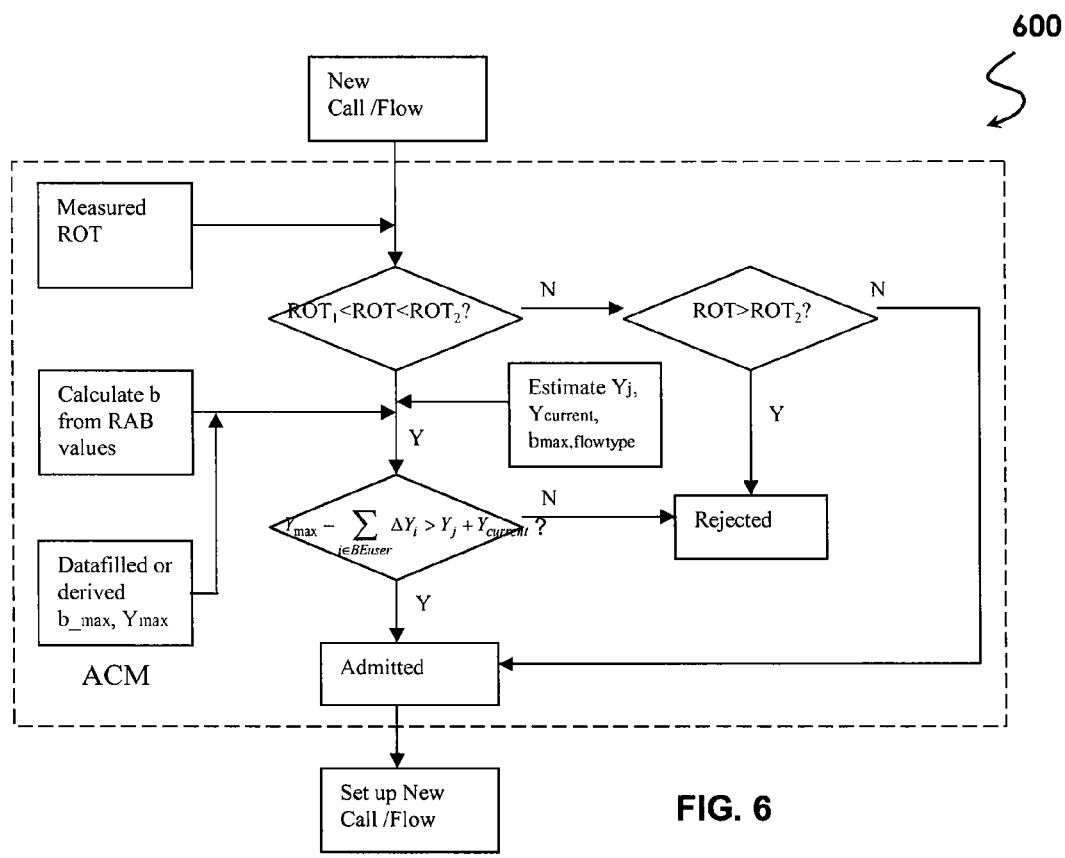
FIG. 6 is a diagram depicting a flow chart of QoS Aware RLAC according to certain embodiments of the present invention.

Diagram 600 of FIG. 6 illustratively depicts this process in a flow-chart format. As a special case example, when a sector is serving all EF (i.e. VoIP) users, Condition (4) becomes $$Y_{max} > Y_j + Y_{current} = (N+1)Y_j; \quad (8)$$

where the T2P of EF flow stays constant for the range of b, and average Ecp/Nt are the same for all users, assuming perfect power control. Therefore, Condition (4) may be simplified to:

$$N < N_{max, VoIP}. \quad (9)$$

When the sector operates at loaded condition, with some EF (VoIP) users and some BE users, prior to the "new call" origination:

$$Y_{max} \approx Y_{current}; \quad (9)$$

then:

$$-\sum_{i \in BEUsers} Y_{max} > Y_j. \quad (10)$$

In this illustration, the "new call" takes all resources from BE flows. In Equation (5), b_max is constant. Thus, in order to meet conditions of Equation (10), there exists a maximum allowable b_cur according to Equation (5)—if load contribution of a typical EF or AF flow can be obtained according to Equation (6), which is:

$$b_{cur} < b_{max, flowtype} \quad (11)$$

where, $b_{max, flowtype}$ is the threshold at which the load contribution of BE flows can accommodate a new flow of "flowtype".

Remaining terms from Equation (4) may be determined in the following manner. As referenced hereinabove, long term sector loading may be expressed as b/(1−b). The relationship between T2PInflow and b/(1−b) may be defined for each type of flow, as is illustrated now in reference to diagram 400 of FIG. 4. Assuming that T2POutflow approximately equals T2PInflow at steady state, the three plot lines 402, 404 and 406 define the relationship between T2P and Sector Loading. Plot line 402 represents a delay sensitive, low rate service. Plot line 404 represents a delay sensitive, elastic service. Plot line 406 represents a delay tolerant, best effort service.

Figure 4:
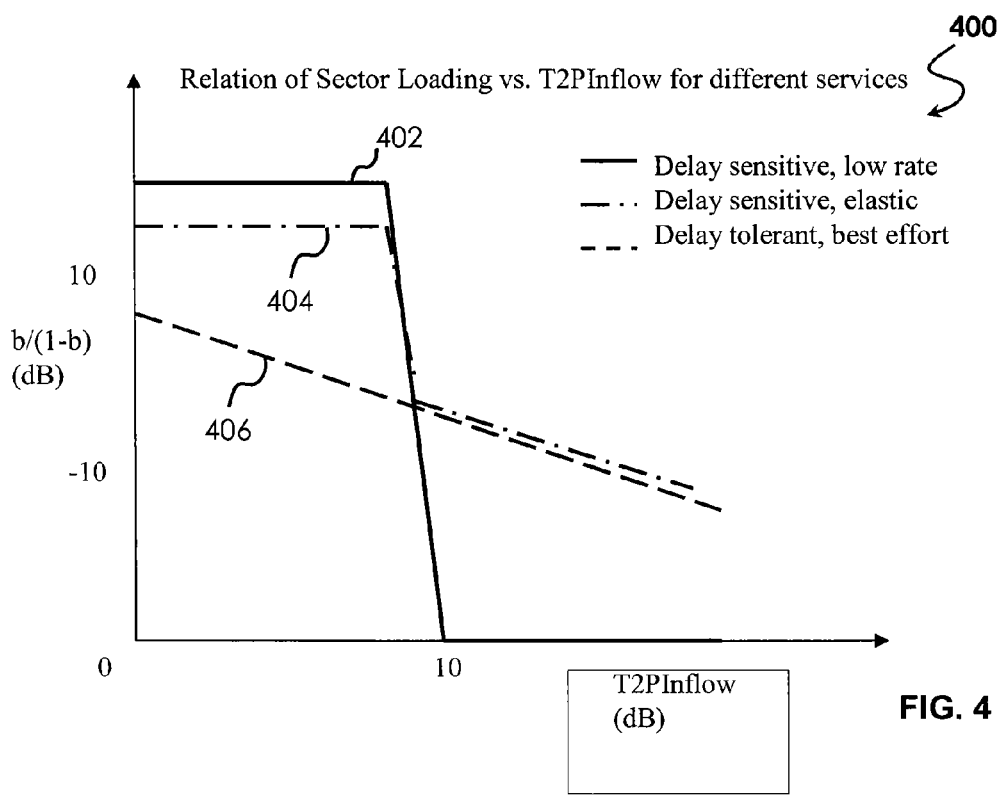
FIG. 4 is a diagram depicting a relationship of T2PInflow to Sector Loading, according to certain embodiments of the present invention.

According to the linear-in-dB relation of T2P to b/(1−b) for BE flows, as illustrated in FIG. 4, F(X)=A−CX, or f(x)=Ax$^c$. From this may be obtained a relation of T2P to b of the form:

$$\frac{\partial T2P_{BE}}{\partial b} = -A\left(\frac{b}{1-b}\right)^{-C} \frac{C}{b(1-b)} = -T2P\frac{C}{b(1-b)} \quad (12)$$

where A and C are constants. For EF flows, T2P changes minimally over most of the range of b, leading to:

$$\frac{\partial T2P_{EF}}{\partial b} \approx 0; \quad (13)$$

while for AF flows, a combination of BE flow and EF flow provides a suitable assessment. Thus, total load change of existing flows depends primarily—if not exclusively—on that of BE flows.

Figure 5:
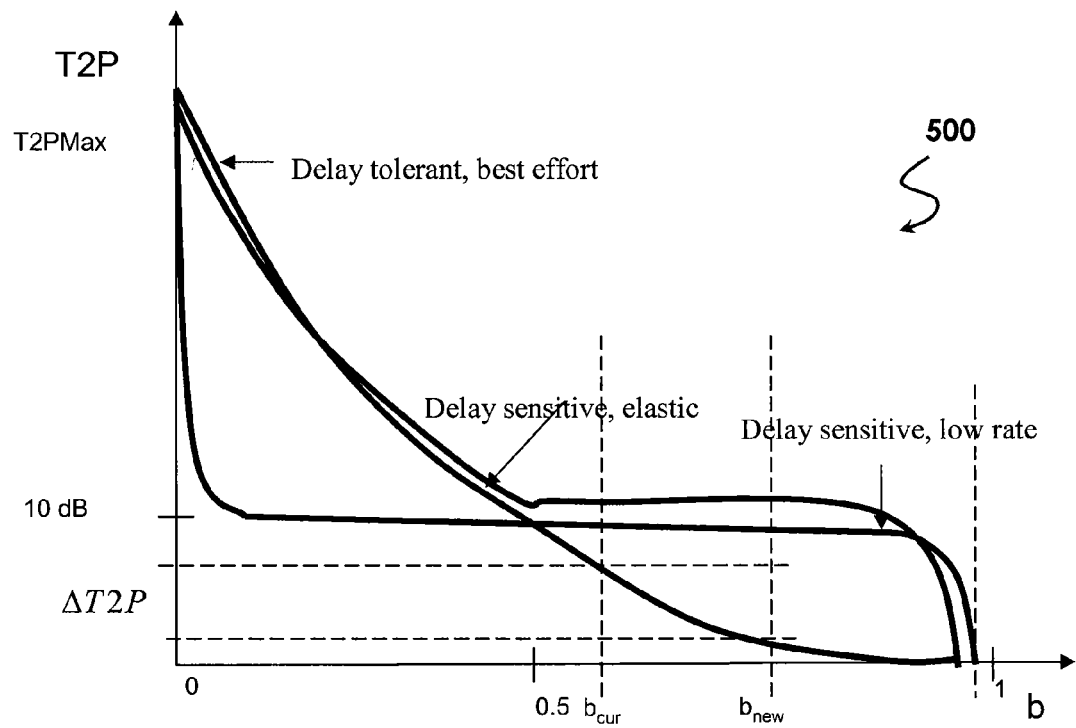
FIG. 5 is a diagram depicting a relationship of T2PInflow to b, according to certain embodiments of the present invention.

The relation of T2P to b for BE, EF and AF flows are illustratively depicted by diagram 500 of FIG. 5. The solid line shows the curve of T2P vs. b for EF flow, which is flat for most of the range of b. The dashed line shows the curve of T2P vs. b for BE flow. Its T2P is monotonically decreasing with b increasing. The dotted line is for AF flow, which is the same as BE flow for a small b range, and is flat for a large b range similar to EF flow.

A projected new Load—that takes into account a "new call" as if it is admitted—may be represented by:

$$Y_{New} = Y_{Current} + \sum_{i}^{N} \Delta Y_i + Y_j; \quad (14)$$

where $Y_{Current}$ is a current sector load, i is the $i^{th}$ user of existing users, $\Delta Y_i$ is the change on the $i^{th}$ user caused by the "new call", N is the total number of existing users, and $Y_j$ is the load addition due to the new call. For a new call from a new user, j is a new number in addition to N, or N+1, and $Y_j$ follows Equation (6). For a new flow from an existing user, j is an existing user and $Y_j$ follows Equation (7).

The change of existing load caused by the new call or flow is:

$$\sum_{i}^{N} \Delta Y = \sum_{i=1}^{N} \sum_{k=1}^{M} \int_{b\_cur}^{b\_new} \frac{\partial Y_i}{\partial T2P_{i,k}} \frac{\partial T2P_{i,k}}{\partial b} db \quad (15)$$

$$\approx \sum_{i=1}^{N} \int_{b\_cur}^{b\_new} \frac{\partial Y_i}{\partial T2P_{i,BE}} \frac{\partial T2P_{i,BE}}{\partial b} db;$$

where N is the number of terminals, and M is the number of flows at the $i^{th}$ terminal. The first derivative term is obtained from load estimation as a function of T2P, and is positive since higher T2P corresponds to higher load. It may be expressed as:

$$\frac{\partial Y_i}{\partial T2P_{i,BE}} = \frac{\overline{\left(\frac{E_{c,p}}{N_t}\right)_i}}{\left[1 + \overline{\left(\frac{E_{c,p}}{N_t}\right)_i}\left(1 + H_i + \sum_{k=1}^{M} T2P_{i,k}\right)\right]^2} \quad (16)$$

$$= \overline{\left(\frac{E_{c,p}}{N_t}\right)_i}(1 - Y_i)^2.$$

The second derivative term is determined by the curve of T2P vs. b for the BE flow. Only BE flows contribute to the integral, since EF flows are not elastic or do not change significantly with varying b. This yields a derivative over b that is approximately zero. BE flows are elastic, and their throughput may decrease with increasing b; while AF flows may be considered as flows combining EF and BE flows. The value of b_cur is the current b value, and b_new is a projected b value—one that may be chosen as a worst case b value ($b_{max}$) for admission control purposes.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of providing reverse link admission control with quality of service differentiation in a wireless communication system, utilizing a reverse link interference metric and a long-term sector loading metric measured over a period of time, comprising the steps of:
    evaluating a first set of preconditions to determine whether or not sufficient resources are available for a new call to be admitted and rejecting the new call if the first set of preconditions is not satisfied;
    admitting a new call if the first set of preconditions is satisfied and the reverse link interference metric is below a first threshold for the reverse link interference metric;
    rejecting a new call if the first set of preconditions is satisfied and the reverse link interference metric is above a second threshold for the reverse link interference metric; and
    evaluating, where the first set of preconditions is satisfied and the reverse link interference metric is between the first and second thresholds, the long-term sector loading metric measured over the period of time to selectively admit or reject a new call,
    wherein the long-term sector loading metric further comprises a load estimation that comprehends a ratio of traffic channel power to pilot channel power and a busy time ratio, and
    wherein the step of evaluating the long-term sector loading metric further comprises determining whether a projected load is less than a third threshold derived from the thresholds of the reverse link interference metric, wherein the projected load equals a sum of current load, load change on existing elastic flows, and an estimated load addition by the new call.

2. The method of claim 1, wherein the step of evaluating a set of preconditions further comprises determining whether a number of active media access control (MAC) channels does not exceed a maximum value.

3. The method of claim 1, wherein the step of evaluating a set of preconditions further comprises determining whether a number of remaining channel elements is equal to or greater than a minimum allowed number.

4. The method of claim 1, wherein the step of evaluating a set of preconditions further comprises determining whether a number of specific application users does not exceed a preset maximum number allowed.

5. The method of claim 1, wherein the a reverse link interference metric further comprises a rise over thermal index.

6. The method of claim 1, wherein the step of evaluating the long-term sector loading metric further comprises determining whether a busy time ratio is less than a fourth threshold that is predetermined for accommodating a delay-sensitive and low rate flow.

7. The method of claim 1, wherein the step of evaluating the long-term sector loading metric further comprises determining whether the number of delay-sensitive low-rate users is less than a fifth threshold for a maximum number of delay-sensitive low-rate users within a sector.

8. A reverse link admission control structure operating within a wireless communication system, having quality of service differentiation, comprising:
    structure adapted to evaluate a first set of preconditions to determine whether or not sufficient resources are available for a new call to be admitted and reject the new call if the first set of preconditions is not satisfied;
    structure adapted to admit a new call if the first set of preconditions is satisfied and a reverse link interference metric is below a first threshold for the reverse link interference metric;
    structure adapted to reject a new call if the first set of preconditions is satisfied and the reverse link interference metric is above a second threshold for the reverse link interference metric; and
    structure adapted to evaluate, where the first set of preconditions is satisfied and the reverse link interference metric is between the first and second thresholds, a long-term sector loading metric measured over a period of time to selectively admit or reject a new call,
    wherein the long-term sector loading metric further comprises a load estimation that comprehends a ratio of traffic channel power to pilot channel power and a busy time ratio, and
    wherein the structure adapted to evaluate the long-term sector loading metric determines whether a projected load is less than a third threshold derived from the thresholds of the reverse link interference metric, wherein the projected load equals a sum of current load, load change on existing elastic flows, and an estimated load addition by the new call.

9. The structure of claim 8, wherein the structure adapted to evaluate a set of preconditions determines whether a number of active media access control (MAC) channels do not exceed a maximum value.

10. The structure of claim 8, wherein the structure adapted to evaluate a set of preconditions determines whether a number of remaining channel elements is equal to or greater than a minimum allowed number.

11. The structure of claim 8, wherein the structure adapted to evaluate a set of preconditions determines whether a number of specific application users do not exceed a preset maximum number allowed.

12. The structure of claim 8, wherein the reverse link interference metric comprises a rise over thermal index.

13. The structure of claim 8, wherein the structure adapted to evaluate the long-term sector loading metric determines whether a busy time ratio is less than a fourth threshold that is predetermined for accommodating a delay-sensitive and low rate flow when a sector operates at loaded condition.

14. The structure of claim 8, wherein the structure adapted to evaluate the long-term sector loading metric determines whether the number of delay-sensitive low-rate users is less than a fifth threshold for a maximum number of delay-sensitive low-rate users within a sector.

* * * * *